(12) United States Patent
Li et al.

(10) Patent No.: US 11,412,810 B2
(45) Date of Patent: Aug. 16, 2022

(54) SHOE ENERGY COLLECTING DEVICE

(71) Applicant: SHANGHAI UNIVERSITY, Shanghai (CN)

(72) Inventors: Zhongjie Li, Shanghai (CN); Fan Shen, Shanghai (CN); Yan Peng, Shanghai (CN); Jun Luo, Shanghai (CN); Shaorong Xie, Shanghai (CN); Huayan Pu, Shanghai (CN)

(73) Assignee: Shanghai University, Shanghai (CN)

( * ) Notice: Subject to any disclaimer, the term of this patent is extended or adjusted under 35 U.S.C. 154(b) by 0 days.

(21) Appl. No.: 17/538,708

(22) Filed: Nov. 30, 2021

(65) Prior Publication Data

US 2022/0175079 A1 Jun. 9, 2022

(30) Foreign Application Priority Data

Dec. 7, 2020 (CN) .......................... 202011430543.9

(51) Int. Cl.
*A43B 3/42* (2022.01)
*H02N 1/04* (2006.01)
(Continued)

(52) U.S. Cl.
CPC ............ *A43B 3/42* (2022.01); *H02K 11/0094* (2013.01); *H02K 11/05* (2016.01); *H02K 35/04* (2013.01);
(Continued)

(58) Field of Classification Search
CPC ...... A43B 3/42; H02K 11/0094; H02K 11/05; H02K 35/04; H02N 1/04; H02N 2/181; H02N 2/183; H02N 2/00; H02N 2/0015
(Continued)

(56) References Cited

U.S. PATENT DOCUMENTS

| | | | | |
|---|---|---|---|---|
| 2008/0129147 | A1* | 6/2008 | Thiesen | H02K 35/02 310/319 |
| 2014/0338458 | A1 | 11/2014 | Wang et al. | |

FOREIGN PATENT DOCUMENTS

| | | | |
|---|---|---|---|
| CN | 102570620 A | | 7/2012 |
| CN | 104836478 | * | 8/2015 |

(Continued)

OTHER PUBLICATIONS

The First Chinese Office Action for Chinese Application No. 202011430543.9, The State Intellectual Property Office of People's Republic of China, Beijing City, China, dated Nov. 30, 2021.

*Primary Examiner* — Ahmed Elnakib
(74) *Attorney, Agent, or Firm* — M&B IP Analysts, LLC (57) ABSTRACT

A shoe energy collecting device includes a shell, a piezoelectric assembly, an elastic component, a magnet array, a base, a supporting block, an upper friction assembly and a lower friction assembly. The shell includes a supporting shell and a plastic shell connected in sequence. The base is provided below the supporting block in the supporting shell, the lower friction assembly is provided between the supporting block and the base. The upper friction assembly is provided on an inner wall of a top surface of the plastic shell. A coil is provided on a lower surface of the lower friction assembly at a side of the plastic shell, and the magnet array is provided below the coil. The piezoelectric assembly is provided in the plastic shell, the elastic component is provided on a side wall of the plastic shell away from the supporting block, and connected with the piezoelectric assembly.

10 Claims, 5 Drawing Sheets

(51) Int. Cl.
    *H02N 2/18*     (2006.01)
    *H02K 35/04*    (2006.01)
    *H02K 11/00*    (2016.01)
    *H02K 11/05*    (2016.01)

(52) U.S. Cl.
    CPC ............... *H02N 1/04* (2013.01); *H02N 2/181* (2013.01); *H02N 2/183* (2013.01)

(58) Field of Classification Search
    USPC .................................. 310/300, 309, 310, 311
    See application file for complete search history.

(56) References Cited

FOREIGN PATENT DOCUMENTS

| | | | |
|---|---|---|---|
| CN | 105952595 | A | 9/2016 |
| CN | 106787945 | * | 5/2017 |
| CN | 106849596 | A | 6/2017 |
| CN | 206390386 | U | 8/2017 |
| CN | 206439668 | U | 8/2017 |
| CN | 208143112 | * | 11/2018 |
| CN | 110611414 | A | 12/2019 |
| CN | 111493501 | A | 8/2020 |
| CN | 112117928 | * | 12/2020 |
| CN | 112532102 | B | 9/2021 |
| KR | 20160112043 | A | 9/2016 |

* cited by examiner

SHOE ENERGY COLLECTING DEVICE

CROSS REFERENCE TO RELATED APPLICATION

This patent application claims the benefit and priority of Chinese Patent Application No. 202011430543.9 filed on Dec. 7, 2020, the disclosure of which is incorporated by reference herein in its entirety as part of the present application.

TECHNICAL FIELD

The present disclosure relates to the technical field of energy collection, in particular to a shoe energy collecting device.

BACKGROUND ART

Wearable smart devices are becoming more and more popular, such as smart watches, smart running shoes, anti-lost devices for the aged and children, etc. At present, these components are mainly powered by batteries. The main problem of being powered by batteries is battery life and environmental protection. The application scenarios of these devices are all attached to the human body, and human beings are doing a lot of exercises every day, such as walking, breathing, beating heart and so on. Collecting the energy can well solve the power supply problem of the above components.

At present, most of the human energy collecting devices use piezoelectric materials or electromagnetic devices. These devices need enough exercise space, or need to add additional wearable devices, such as the patent with application number 201610527808.4. Furthermore, it is also highly dependent on frequency, and the frequency of human walking is only 1-2 Hz, which leads to the problem of low power generation. With the development of friction nano power generation technology, the problem of low-frequency energy collection has been well solved. For example, the patent with the application number 202010312952.2 can collect the energy of the human body when the schoolbag vibrates up and down during walking, but this can only collect the energy when using the backpack, and the application scenario is limited.

SUMMARY

To solve the above technical problems, the shoe energy collecting device provided by the present disclosure integrates three different power generation modes of triboelectrification, electromagnetic induction and piezoelectricity, and is wide in application scenarios, high in energy collection efficiency and simple in structure.

To achieve the above purpose, the present disclosure provides the following solution.

It is provided a shoe energy collecting device, including a shell, a piezoelectric assembly, an elastic component, a magnet array, a base, a supporting block, an upper friction assembly and a lower friction assembly. The shell includes a supporting shell and a plastic shell which are connected in sequence and communicated with each other. The supporting block is provided in the supporting shell. The supporting block is inverted L-shaped. The base is provided below the supporting block, the lower friction assembly is provided between the supporting block and the base. The lower friction assembly is slidable relative to the base. The upper friction assembly is provided on an inner wall of a top surface of the plastic shell. The upper friction assembly and the lower friction assembly are capable of being electrified by friction. The lower friction assembly extends into the plastic shell. A coil is provided on a lower surface of the lower friction assembly at a side of the plastic shell. The magnet array is provided below the coil. The piezoelectric assembly is provided in the plastic shell. The elastic component is provided on a side wall of the plastic shell away from the supporting block. The elastic component is connected with the piezoelectric assembly, and the lower friction assembly is capable of being in contact with the piezoelectric assembly.

In some embodiments, a bottom surface of the supporting shell is connected with that of the plastic shell, while side surfaces and a top surface of the supporting shell are not connected with those of the plastic shell.

In some embodiments, the supporting block includes a vertical block and a horizontal block, the vertical block is provided at a side of the supporting shell away from the plastic shell, the horizontal block is fixed at a top of the vertical block. The base is fixed at a side of the vertical block, the base is positioned below the horizontal block, and an upper surface of the base is inclined downward from an end close to the vertical block to another end far away from the vertical block.

In some embodiments, the lower friction assembly includes a bottom plate, a slider, a first electrode layer and a first friction layer. The slider is fixed at a bottom surface of the bottom plate close to the base. The slider is a right-angled triangular prism. An inclined angle of an inclined plane of the right-angled triangular prism is equal to an inclined angle of the upper surface of the base. A ratio of a length of a horizontal side to a length of a vertical side of a cross section of the right-angled triangular prism is greater than 1. The coil is fixed at the bottom surface of the bottom plate away from the base, the first electrode layer is provided on the bottom plate, and the first friction layer is provided on the first electrode layer.

In some embodiments, the upper friction assembly includes a second electrode layer and a second friction layer, the second electrode layer is provided on the inner wall of the top surface of the plastic shell, and the second friction layer is provided on the second electrode layer.

In some embodiments, the first friction layer includes a plurality of first friction belts provided at equal intervals, a length direction of the first friction belts is perpendicular to a length direction of the bottom plate. The second friction layer includes a plurality of second friction belts provided at equal intervals, the second friction belts are parallel to the first friction belts. A width of each first friction belt is equal to a distance between two adjacent first friction belts. A width of each second friction belt is equal to a distance between two adjacent second friction belts, and the width of the second friction belt is equal to that of the first friction belt.

In some embodiments, the piezoelectric assembly includes a cantilever beam, a piezoelectric sheet and a supporting plate. The cantilever beam is vertically fixed at another side of the plastic shell away from the supporting shell, the cantilever beam is connected with the elastic component. The supporting plate and the piezoelectric sheet are respectively fixed on an upper part and a lower part of a side of the cantilever beam away from the elastic component, and the bottom plate is capable of being in contact with the supporting plate and the cantilever beam.

In some embodiments, the magnet array includes a plurality of small magnets connected in sequence, and an N pole and an S pole of each small magnet correspond to an S pole and an N pole of an adjacent small magnet respectively.

In some embodiments, the shoe energy collecting device further includes three rectifier bridges provided in the plastic shell. The upper friction assembly and the lower friction assembly are connected with an intelligent chip in the shoe through one rectifier bridge, and the piezoelectric assembly and the coil are connected with the intelligent chip in the shoe through other two rectifier bridges, respectively.

In some embodiments, the shoe energy collecting device further includes an energy storage component and three rectifier bridges provided in the plastic shell. The upper friction assembly and the lower friction assembly are connected with the energy storage component through one rectifier bridge, and the piezoelectric assembly and the coil are connected with the energy storage component through other two rectifier bridges, respectively Compared with the prior art, the present disclosure has the following technical effects.

According to the shoe energy collecting device provided by the present disclosure, the upper friction assembly and the lower friction assembly can be electrified by friction, the lower surface of the lower friction assembly at a side of the plastic shell is provided with a coil. The magnet array is provided below the coil. When the lower friction assembly moves, the coil cuts a magnetic induction line to generate current, and the lower friction assembly is capable of being in contact with the piezoelectric assembly, so that the piezoelectric assembly is deformed to generate electricity. It can be seen that three different power generation modes of triboelectrification, electromagnetic induction and piezoelectricity are integrated in the present disclosure. The three power generation units can be driven to generate electricity at the same time only by slight displacement in the vertical direction. When walking slowly, the displacement frequency is small, and triboelectrification is mainly used for power generation. When running, the displacement frequency is large, and electromagnetic power generation is mainly used for power generation. During the bouncing movement, the displacement range is large and the impact force is large, and the piezoelectric assemblies are mainly used for power generation. The three power generation modes are matched to enable high-efficiency energy collection under various use conditions. Furthermore, the device is simple in structure and is built in shoes without adding additional wearing devices, which expands the application range. The supporting shell is placed at the foot center, and the plastic shell with the power generation part is placed at the heel, so that the wearing comfort is not affected, and high energy collection efficiency can be obtained.

BRIEF DESCRIPTION OF THE DRAWINGS

In order to explain the embodiments of the present disclosure or the technical solution in the prior art more clearly, the drawings used in the embodiments will be briefly introduced hereinafter. Apparently, the drawings in the following description are only some embodiments of the present disclosure. For those skilled in the art, other drawings can be obtained according to these drawings without paying creative efforts.

List of reference numbers: 100 shoe energy collecting device; 1 shell; 101 supporting shell; 102 plastic shell; 2 piezoelectric assembly; 201 cantilever beam; 202 supporting plate; 203 piezoelectric sheet; 3 elastic component; 4 magnet array; 401 small magnet; 5 base; 6 supporting block; 601 vertical block; 602 horizontal block; 7 lower friction assembly; 701 bottom plate; 702 slider; 703 first electrode layer; 704 second friction layer; 7041 second friction belt; 8 upper friction assembly; 801 second electrode layer; 802 second friction layer; 8021 second friction belt; 9 coil; 10 rectifier bridge; 11 intelligent chip; 12 energy storage component.

DETAILED DESCRIPTION OF THE EMBODIMENTS

The technical solution in the embodiments of the present disclosure will be described clearly and completely with reference to the drawings in the embodiments of the present disclosure. Apparently, the described embodiments are only some embodiments of the present disclosure, rather than all the embodiments. Based on the embodiments of the present disclosure, all other embodiments obtained by those skilled in the art without paying creative efforts belong to the scope of protection of the present disclosure.

The purpose of the present disclosure is to provide a shoe energy collecting device which integrates three different power generation modes of triboelectrification, electromagnetic induction and piezoelectricity, and the shoe energy collecting device is widely used, has high energy collection efficiency and simple structure.

In order to make the above objects, features and advantages of the present disclosure more obvious and understandable, the present disclosure will be further explained in detail hereinafter with reference to the drawings and specific embodiments.

Figure 1:
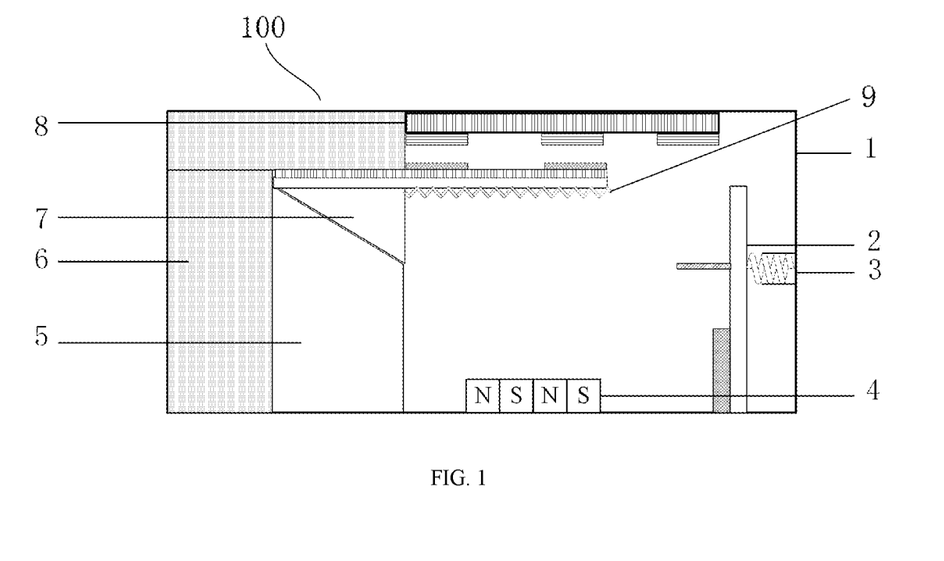
FIG. 1 is a schematic structural diagram of a shoe energy collecting device according to the present disclosure.
Figure 2:
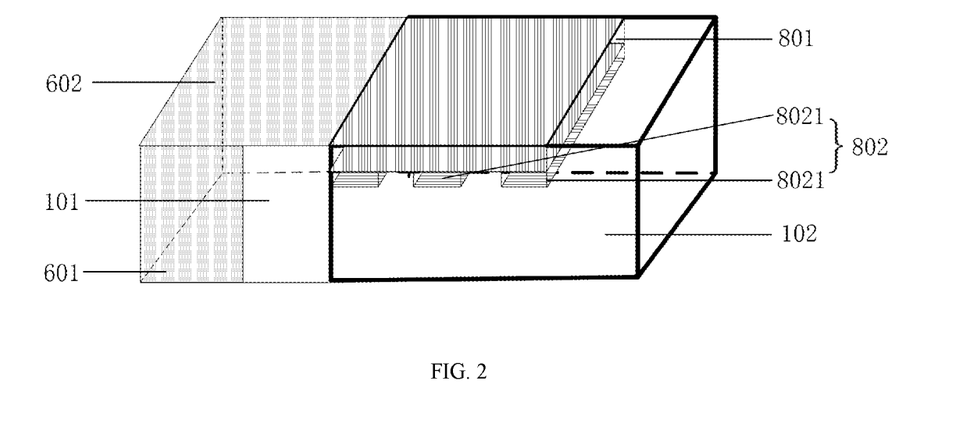
FIG. 2 is a schematic structural diagram of a shell and an upper friction assembly in the shoe energy collecting device according to the present disclosure.

As shown in FIG. 1-FIG. 2, this embodiment provides a shoe energy collecting device 100, which includes a shell 1, a piezoelectric assembly 2, an elastic component 3, a magnet array 4, a base 5, a supporting block 6, an upper friction assembly 8 and a lower friction assembly 7. The shell 1 includes a supporting shell 101 and a plastic shell 102 which are connected in sequence. The supporting shell 101 is communicated with the plastic shell 102. The supporting block 6 is provided in the supporting shell 101. The supporting block 6 is inverted L-shaped. The base 5 is provided below the supporting block 6. Specifically, the supporting block 6 and the base 5 are both fixed in the supporting shell 101. The lower friction assembly 7 is provided between the supporting block 6 and the base 5. The lower friction assembly 7 is slidable relative to the base 5. The upper friction assembly 8 is provided on the inner wall of the top surface of the plastic shell 102. The upper friction assembly 8 and the lower friction assembly 7 is capable of being electrified by friction. The upper friction assembly 8 and the lower friction assembly 7 form a friction unit. The lower friction assembly 7 extends into the plastic shell 102. A coil 9 is provided on the lower surface of the lower friction assembly 7 at one side of the plastic shell 102. The magnet array 4 is provided below the coil 9. The magnet array 4 and the coil 9 form an electromagnetic unit. The piezoelectric assembly 2 is provided in the plastic shell 102. The elastic component 3 is provided on the side wall of the plastic shell 102 far away from the supporting block 6. The elastic component 3 is connected with the piezoelectric assembly 2, and the lower friction assembly 7 is capable of being in contact with the piezoelectric assembly 2.

When the lower friction assembly 7 moves, the upper friction assembly 8 and the lower friction assembly 7 can be electrified by friction, the coil 9 cuts a magnetic induction line to generate current, and the lower friction assembly 7 is capable of being in contact with the piezoelectric assembly 2, so that the piezoelectric assembly 2 is deformed to generate electricity. It can be seen that the device in this embodiment integrates three different power generation modes of triboelectrification, electromagnetic induction and piezoelectricity. The three power generation units can be driven to generate electricity at the same time only by slight displacement in the vertical direction. When walking slowly, the displacement frequency is small, and triboelectrification is mainly used for power generation; when running, the displacement frequency is large, and electromagnetic power generation is mainly used for power generation; and during the bouncing movement, the displacement range is large and the impact force is large, and the piezoelectric assemblies are mainly used for power generation. The three power generation modes are matched to enable high-efficiency energy collection under various use conditions, thereby having high flexibility. Furthermore, the device is simple in structure, has small occupied space, and is built in shoes without adding additional wearing devices, which expands the application range. The supporting shell 101 is placed at the foot center, and the plastic shell 102 installed with the power generation part is placed at the heel, so that the wearing comfort is not affected, and high energy collection efficiency can be obtained.

Specifically, the bottom surface of the supporting shell 101 is connected with that of the plastic shell 102, while the side surface and the top surface of the supporting shell 101 are not connected with those of the plastic shell 102. The plastic shell 102 is made of ethylene-vinyl acetate copolymer (EVA plastic), which has good flexibility. The supporting shell 101, the base 5 and the supporting block 6 are all made of hard rubber, which is not easy to deform and can ensure the wearing comfort.

The supporting block 6 includes a vertical block 601 and a horizontal block 602. The vertical block 601 is provided at one side of the supporting shell 101 away from the plastic shell 102. The horizontal block 602 is fixed at the top of the vertical block 601. The vertical block 601 and the horizontal block 602 form an inverted L-shaped supporting block 6. Specifically, the vertical block 601 and the horizontal block 602 are fixed at the left side and the upper side of the supporting shell 101, respectively, thus playing a supporting role. The base 5 is fixed at one side of the vertical block 601. The base 5 is positioned below the horizontal block 602. The upper surface of the base 5 is inclined downward from one end close to the vertical block 601 to the other end far away from the vertical block 601.

Figure 3:
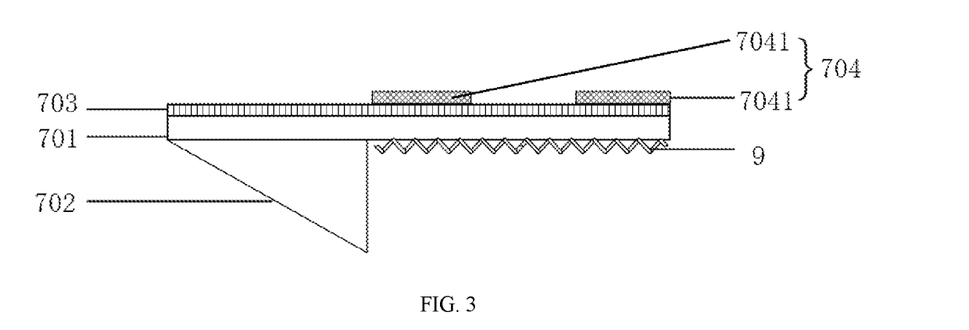
FIG. 3 is a schematic structural diagram of a lower friction assembly in the shoe energy collecting device according to the present disclosure.

As shown in FIG. 3, the lower friction assembly 7 includes a bottom plate 701, a slider 702, a first electrode layer 703 and a first friction layer 704. The slider 702 is fixed at a bottom surface of the bottom plate 701 at one end thereof close to the base 5. The slider 702 is a right-angled triangular prism. The inclined angle of the inclined plane of the right-angled triangular prism is the same as the inclined angle of the upper surface of the base 5. The ratio of the length of the horizontal side to the length of the vertical side of the cross section of the right-angled triangular prism is greater than 1. The slider 702 cooperates with the base 5 to realize displacement amplification, that is, the slider 702 and the base 5 form a displacement amplification mechanism, which utilizes triangular characteristics to realize displacement amplification. Furthermore, the displacement amplification factor is controlled by controlling the ratio of right-angle sides in the horizontal direction to right-angle sides in the vertical direction. The displacement amplification mechanism can convert the displacement in the vertical direction into the displacement in the horizontal direction and improve the displacement amplitude, thereby improving the power generation capacity. The coil 9 is fixed on the bottom surface of the bottom plate 701 at the other end thereof far away from the base 5. The first electrode layer 703 is provided on the upper surface of the bottom plate 701. The first friction layer 704 is provided on the first electrode layer 703. Specifically, the first friction layer 704 is closely attached to the upper part of the first electrode layer 703. It should be noted that the friction part at the right side of the lower friction assembly 7 is very thin and light, and the whole center of gravity is in the area of the right-angled triangular prism at the left side, which is supported by the base 5. Furthermore, for the purpose of displacement amplification, the slope of the right-angled triangular prism is low enough to maintain the overall stability.

In this embodiment, the ratio of the length of the horizontal side to the length of the vertical side of the cross section of the right-angled triangular prism is 2:1, that is, the slider 702 moves downward by one unit and moves to the right by two units at the same time. The slider 702 is made of hard rubber, and the bottom plate 701 is made of acrylic material.

Specifically, the upper friction assembly 8 includes a second electrode layer 801 and a second friction layer 802, the second electrode layer 801 is provided on the inner wall of the top surface of the plastic shell 102, and the second friction layer 802 is provided on the second electrode layer 801; specially, the second friction layer 802 is closely attached to the lower part of the second electrode layer 801.

The first friction layer 704 includes a plurality of first friction belts 7041 provided at equal intervals. The length direction of the first friction belts 7041 is perpendicular to the length direction of the bottom plate 701. The second friction layer 802 includes a plurality of second friction belts 8021 provided at equal intervals. The second friction belts 8021 are parallel to the first friction belts 7041. The width of the first friction belt 7041 is the same as the distance between two adjacent first friction belts 7041. The width of the second friction belt 8021 is the same as the distance between two adjacent second friction belts 8021. The width of the second friction belt 8021 is the same as that of the first friction belt 7041. The first friction layer 704 and the second friction layer 802 are distributed in strips, which can collect energy with different motion amplitudes. Specifically, the width of the first friction belt 7041 and the second friction belt 8021 determines the minimum displacement required for energy collection. The friction unit uses a plurality of friction belts to reduce the displacement requirement of triboelectrification, and at the same time can meet the energy collection of large-scale displacement.

In order to generate greater power generation efficiency when the upper friction assembly 8 and the lower friction assembly 7 cooperate, the first electrode layer 703 and the second electrode layer 801 can be made of any metal with good conductivity, such as silver, copper and aluminum. The first friction layer 704 can be made of any non-metallic material with strong electron obtaining ability in triboelectric series, such as polyethylene, polypropylene, polytetrafluoroethylene, etc. The second friction layer 802 can be made of any non-metallic material with strong electron loss capability in triboelectric series, such as ethyl cellulose, nylon, wool, etc.

In this embodiment, the first electrode layer 703 is made of a copper electrode, and the first friction layer 704 is made of polytetrafluoroethylene. The second electrode layer 801 is made of a copper electrode, and the second friction layer 802 is made of nylon.

In this embodiment, the first electrode layer 703 covers the whole bottom plate 701. The length of the bottom plate 701 is equal to that of the second electrode layer 801. The second friction layer 802 includes three second friction belts 8021. The first friction layer 704 includes two first friction belts 7041. At the initial position shown in FIG. 1, the end of the bottom plate 701 is flush with the end of the second friction belt 8021 in the second friction layer 802 (counted from left to right), and the two first friction belts 7041 are right below the first two second friction belts 8021 (counted from left to right).

Figure 5:
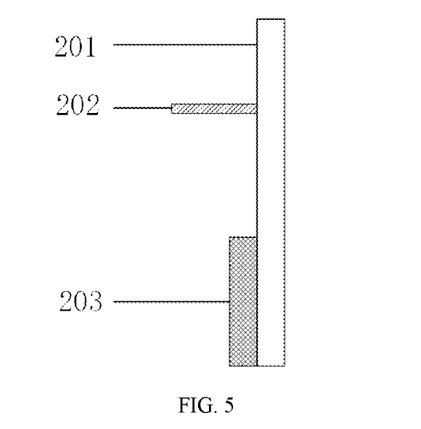
FIG. 5 is a schematic structural diagram of a piezoelectric assembly in the shoe energy collecting device according to the present disclosure.

As shown in FIG. 5, the piezoelectric assembly 2 includes a cantilever beam 201, a piezoelectric sheet 203 and a supporting plate 202. The cantilever beam 201 is vertically fixed at one side of the plastic shell 102 away from the supporting shell 101. The cantilever beam 201 is connected with the elastic component 3. The supporting plate 202 and the piezoelectric sheet 203 are respectively fixed on the upper part and the lower part of one side of the cantilever beam 201 away from the elastic component 3. The bottom plate 701 is capable of being in contact with the supporting plate 202 and the cantilever beam 201. Specifically, the elastic component 3 is a spring.

Figure 4:
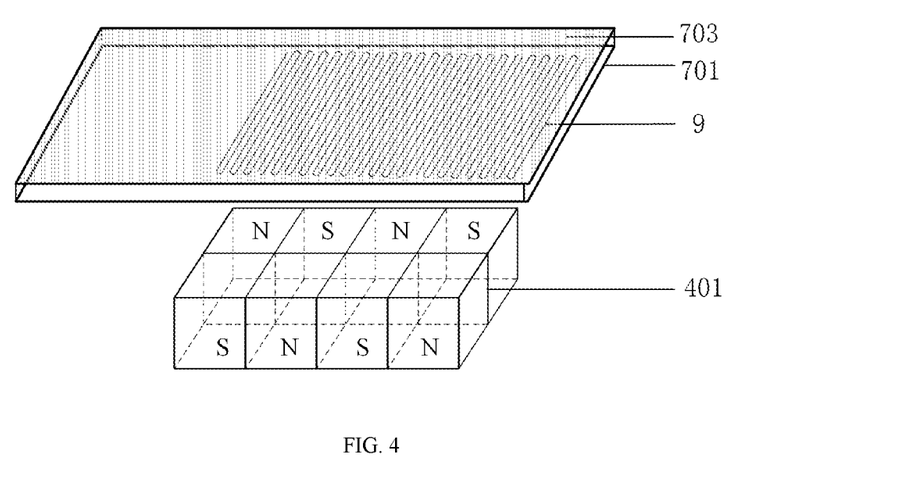
FIG. 4 is a schematic structural diagram of an electromagnetic unit in the shoe energy collecting device according to the present disclosure.

The magnet array 4 is provided at the inner bottom of the plastic shell 102. As shown in FIG. 4, the magnet array 4 includes a plurality of small magnets 401 connected in sequence, and the N pole and the S pole of any two adjacent small magnets 401 correspond to each other. By using a plurality of small magnets 401 with the N pole and the S pole alternately placed, the sudden change of magnetic flux density is artificially increased, and the power generation efficiency of the electromagnetic unit is improved.

Figure 8:
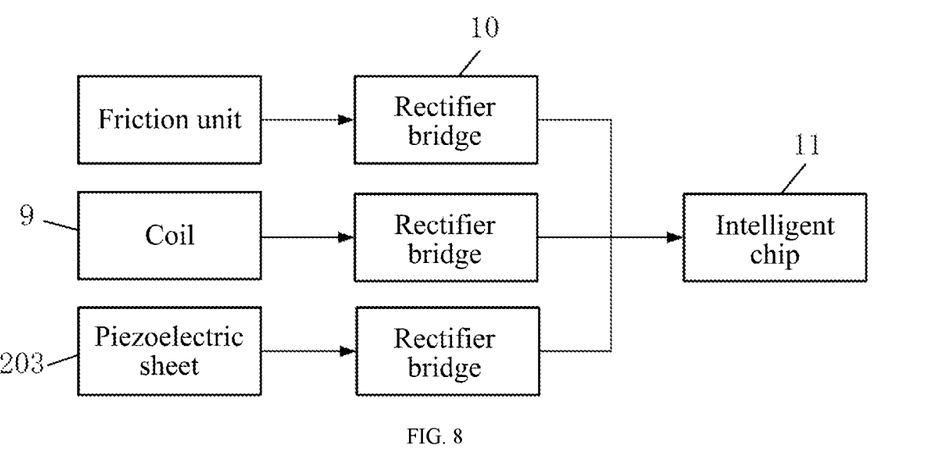
FIG. 8 is a circuit diagram of supplying power to an intelligent chip in the shoe energy collecting device according to the present disclosure.

As shown in FIG. 8, in this specific embodiment, the shoe energy collecting device further includes three rectifier bridges 10 provided in the plastic shell 102. The upper friction assembly 8 and the lower friction assembly 7 are connected with the intelligent chip 11 in the shoe through one rectifier bridge 10, that is, the friction unit formed by the upper friction assembly 8 and the lower friction assembly 7 is connected with one rectifier bridge 10. The piezoelectric assembly 2 and the coil 9 are connected with the intelligent chip 11 in the shoe through the other two rectifier bridges 10, respectively, that is, in this embodiment, the device can directly supply power to the intelligent chip 11 in shoes. Specifically, the first electrode layer 703 and the second electrode layer 801 are connected with one rectifier bridge 10, and the piezoelectric sheet 203 is connected with one rectifier bridge 10.

Figure 9:
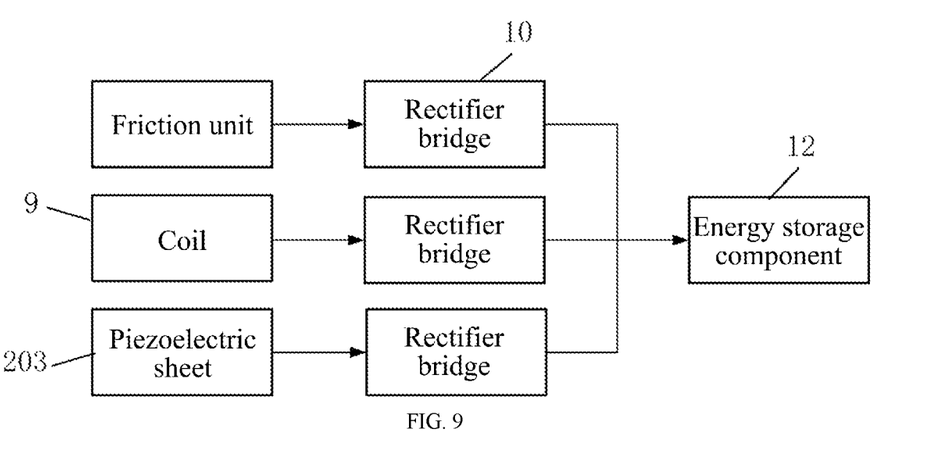
FIG. 9 is a circuit diagram of supplying power to an energy storage component in the shoe energy collecting device provided by the present disclosure.

As shown in FIG. 9, in another specific embodiment, the shoe energy collecting device further includes an energy storage component 12 and three rectifier bridges 10 provided in the plastic shell 102. The upper friction assembly 8 and the lower friction assembly 7 are connected with the energy storage component 12 through one rectifier bridge 10, that is, the friction unit formed by the upper friction assembly 8 and the lower friction assembly 7 is connected with one rectifier bridge 10. The piezoelectric assembly 2 and the coil 9 are connected with the energy storage component 12 through the other two rectifier bridges 10, respectively, that is, in this embodiment, the device can store electric energy in the energy storage component 12. Specifically, the first electrode layer 703 and the second electrode layer 801 are connected with one rectifier bridge 10, the piezoelectric sheet 203 is connected with one rectifier bridge 10, and energy storage component 12 is a lithium battery.

Figure 6:
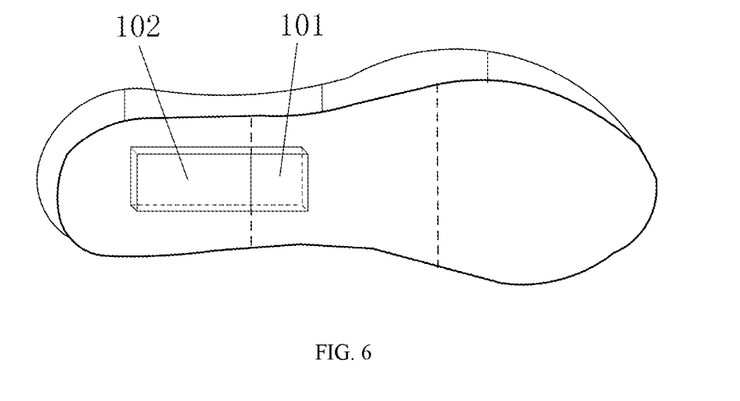
FIG. 6 is a schematic diagram showing installation of the shoe energy collecting device according to the present disclosure.

In this embodiment, the placement position of the shoe energy collecting device 100 in shoes is shown in FIG. 6. The supporting shell 101 is placed at one side of the foot center to reduce the stress, and the plastic shell 102 is placed under the heel for better stress.

Figure 7:
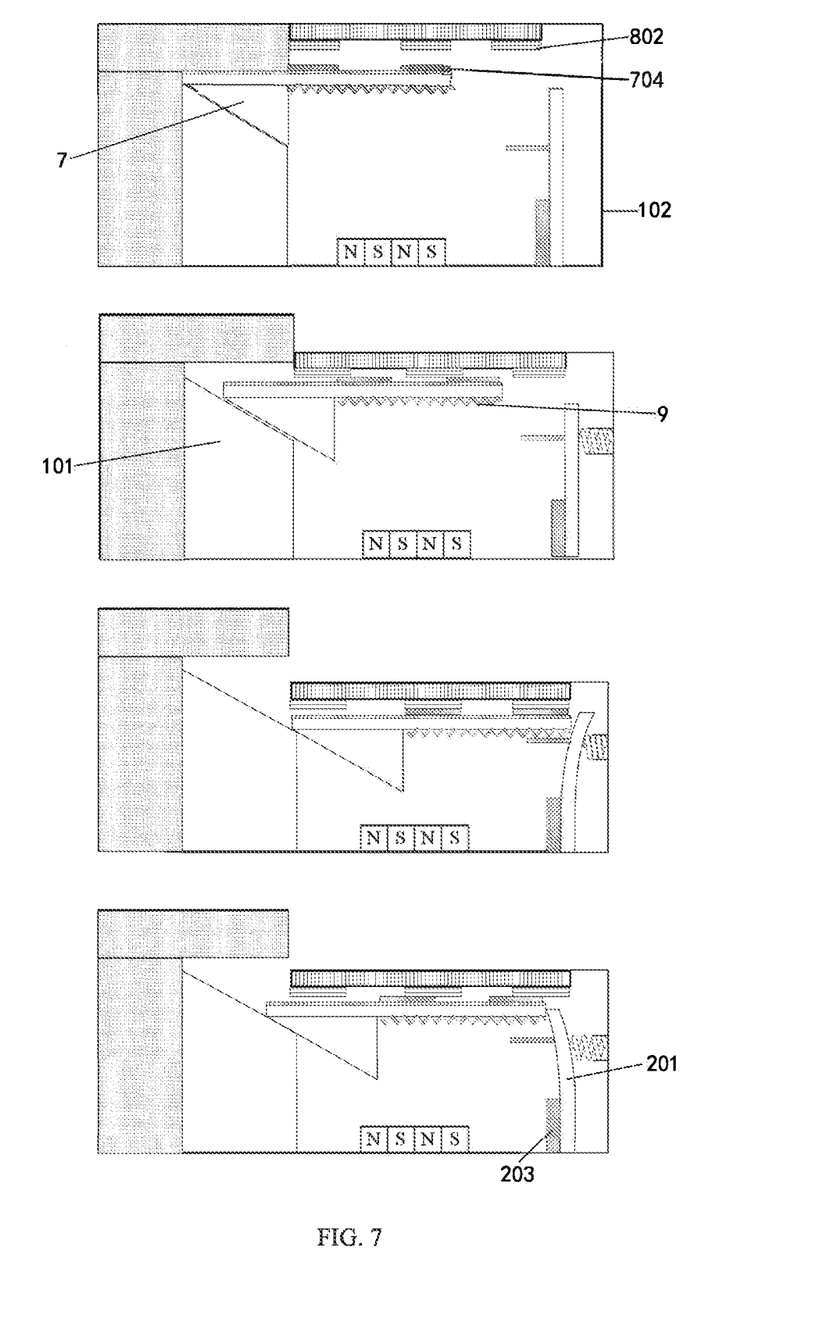
FIG. 7 is a working principle diagram of the shoe energy collecting device according to the present disclosure.

As shown in FIG. 7, when the plastic shell 102 is stepped on by the heel, the first friction layer 704 is in contact with the second friction layer 802. With continuously pressing, the lower friction assembly 7 moves to the right, and the friction unit starts to generate electricity. At the same time, the coil 9 cuts the magnetic induction line to generate current. When the lower friction assembly 7 is pressed to the lowest end, and at the same time, it moves to the right to the maximum displacement, and strikes the cantilever beam 201 to bend the cantilever beam, the piezoelectric sheet 203 is driven to generate electricity. When the heel is lifted, the spring works to push the lower friction assembly 7 back to its original position. At the same time, the first friction layer 704 and the second friction layer 802 continue to be electrified by friction, and the coil 9 cuts the magnetic induction line again to generate current. Therefore, three different power generation modes of triboelectrification, electromagnetic induction and piezoelectricity are configured to generate electricity at the same time, and the energy collection efficiency is remarkably improved.

In this specification, a specific example is applied to illustrate the principle and implementation of the present disclosure, and the explanation of the above embodiments is only used to help understand the method and its core idea of the present disclosure. Furthermore, according to the idea of the present disclosure, there will be some changes in the specific implementation and application scope for those skilled in the art. To sum up, the contents of this specification should not be construed as limiting the present disclosure.

What is claimed is:

1. A shoe energy collecting device, comprising a shell, a piezoelectric assembly, an elastic component, a magnet array, a base, a supporting block, an upper friction assembly and a lower friction assembly, wherein the shell comprises a supporting shell and a plastic shell which are connected in sequence and communicated with each other, the supporting block is provided in the supporting shell, the supporting block is inverted L-shaped, the supporting block comprises a vertical block and a horizontal block, the base is fixed at a side of the vertical block, the base is positioned below the horizontal block, the lower friction assembly is provided between the supporting block and the base, the lower friction assembly is slidable relative to the base, the upper friction assembly is provided on an inner wall of a top surface of the plastic shell, the upper friction assembly and the lower friction assembly are capable of being electrified by friction, the lower friction assembly extends into the plastic shell, a coil is provided on a lower surface of the lower friction assembly at a side of the plastic shell, the magnet array is provided below the coil, the piezoelectric assembly is provided in the plastic shell, the elastic component is provided on a side wall of the plastic shell away from the supporting block, the elastic component is connected with the piezoelectric assembly, and the lower friction assembly is capable of being in contact with the piezoelectric assembly.

2. The shoe energy collecting device according to claim 1, wherein a bottom surface of the supporting shell is connected with that of the plastic shell, while side surfaces and a top surface of the supporting shell are not connected with those of the plastic shell.

3. The shoe energy collecting device according to claim 1, wherein the vertical block is provided at a side of the supporting shell away from the plastic shell, the horizontal block is fixed at a top of the vertical block, and an upper surface of the base is inclined downward from an end close to the vertical block to another end far away from the vertical block.

4. The shoe energy collecting device according to claim 3, wherein the lower friction assembly comprises a bottom plate, a slider, a first electrode layer and a first friction layer, the slider is fixed at a bottom surface of the bottom plate close to the base, the slider is a right-angled triangular prism, an inclined angle of an inclined plane of the right-angled triangular prism is equal to an inclined angle of the upper surface of the base, a ratio of a length of a horizontal side to a length of a vertical side of a cross section of the right-angled triangular prism is greater than 1, the coil is fixed at the bottom surface of the bottom plate away from the base, the first electrode layer is provided on the bottom plate, and the first friction layer is provided on the first electrode layer.

5. The shoe energy collecting device according to claim 4, wherein the upper friction assembly comprises a second electrode layer and a second friction layer, the second electrode layer is provided on the inner wall of the top surface of the plastic shell, and the second friction layer is provided on the second electrode layer.

6. The shoe energy collecting device according to claim 5, wherein the first friction layer comprises a plurality of first friction belts provided at equal intervals, a length direction of the first friction belts is perpendicular to a length direction of the bottom plate, the second friction layer comprises a plurality of second friction belts provided at equal intervals, the second friction belts are parallel to the first friction belts, a width of each first friction belt is equal to a distance between two adjacent first friction belts, a width of each second friction belt is equal to a distance between two adjacent second friction belts, and the width of the second friction belt is equal to that of the first friction belt.

7. The shoe energy collecting device according to claim 4, wherein the piezoelectric assembly comprises a cantilever beam, a piezoelectric sheet and a supporting plate, the cantilever beam is vertically fixed at another side of the plastic shell away from the supporting shell, the cantilever beam is connected with the elastic component, the supporting plate and the piezoelectric sheet are respectively fixed on an upper part and a lower part of a side of the cantilever beam away from the elastic component, and the bottom plate is capable of being in contact with the supporting plate and the cantilever beam.

8. The shoe energy collecting device according to claim 1, wherein the magnet array comprises a plurality of small magnets connected in sequence, and an N pole and an S pole of each small magnet correspond to an S pole and an N pole of an adjacent small magnet respectively.

9. The shoe energy collecting device according to claim 1, further comprising three rectifier bridges provided in the plastic shell, wherein the upper friction assembly and the lower friction assembly are connected with an intelligent chip in the shoe through one rectifier bridge, and the piezoelectric assembly and the coil are connected with the intelligent chip in the shoe through other two rectifier bridges, respectively.

10. The shoe energy collecting device according to claim 1, further comprising an energy storage component and three rectifier bridges provided in the plastic shell, wherein the upper friction assembly and the lower friction assembly are connected with the energy storage component through one rectifier bridge, and the piezoelectric assembly and the coil are connected with the energy storage component through other two rectifier bridges, respectively.

* * * * *